United States Patent [19]

Churchill et al.

[11] Patent Number: 5,908,174
[45] Date of Patent: Jun. 1, 1999

[54] AUTOMATIC SHRINK SHOCK STRUT FOR AN AIRCRAFT LANDING GEAR

[75] Inventors: Robert C. Churchill, Fort Worth; William E. Luce, Colleyville, both of Tex.

[73] Assignee: Coltec Industries Inc., Charlotte, N.C.

[21] Appl. No.: 08/963,000

[22] Filed: Nov. 1, 1997

[51] Int. Cl.⁶ .................................................. B64C 25/18
[52] U.S. Cl. ...................................................... 244/102 SS
[58] Field of Search .......................... 244/102 R, 102 SS, 244/101, 104 FP

[56] References Cited

U.S. PATENT DOCUMENTS

| | | | |
|---|---|---|---|
| 1,918,426 | 7/1933 | Randor | 244/102 SS |
| 2,186,266 | 1/1940 | Onions | 244/102 SS |
| 2,390,661 | 12/1945 | Parilla | 244/102 SS |
| 4,291,850 | 9/1981 | Sharples | 244/102 SS |

FOREIGN PATENT DOCUMENTS

| | | | |
|---|---|---|---|
| 448266 | 5/1948 | Canada | 244/102 SS |

*Primary Examiner*—Galen Barefoot
*Attorney, Agent, or Firm*—Cummings & Lockwood

[57] ABSTRACT

An automatic shrink shock strut for use in conjunction with aircraft landing gear. The landing gear is of the type which includes a shock strut cylinder and a shock strut piston mounted coaxially therewith, and defining there between a shock strut shrink chamber filled with hydraulic fluid and a gas spring chamber filled with a pressurized gas. During retraction of the landing gear, the mechanism transfers the pressurized gas from the gas spring chamber to a transfer cylinder and therein drives a volume of hydraulic fluid from a hydraulic fluid supply in the transfer cylinder to the shock strut shrink chamber. The shock strut responds by shrinking to a shortened length. During extension of the landing gear the mechanism returns works in reverse and returns the pressurized gas to the gas spring chamber to drive the volume of hydraulic fluid from the shock strut shrink chamber back to the hydraulic fluid supply, thereby extending the landing gear to its normal length.

9 Claims, 6 Drawing Sheets

AUTOMATIC SHRINK SHOCK STRUT FOR AN AIRCRAFT LANDING GEAR

BACKGROUND OF THE INVENTION

1. Field of the Invention

This invention relates in general to aircraft landing gear, and more particularly, to a an automatic shock strut which shrinks in size when the landing gear is retracted into the fuselage of the aircraft and returns to a normally extended position after the landing gear extends from the fuselage of the aircraft.

2. Background of the Related Art

In the design and manufacture of aircraft, it is generally desirable to minimize the space required by components of the aircraft. One approach to saving space in aircraft is to shorten the length of landing gear when it is retracted into a stowed position in the aircraft. The shortening of the landing gear may be required by the initial design of an aircraft or may be desired in order to minimize design changes in future generations of an existing aircraft.

A previous attempt to shorten the overall length of a shock strut during retraction is described in U.S. Pat. No. 4,047,681 to Hartel. The disclosed invention provides for a shrinking aircraft landing gear strut including a mechanism for shortening the shock strut that reacts to the rotational movement of the shock strut when moving from the extended position to the retracted position. The mechanism is effective to force the shock strut piston to telescope into the shock strut cylinder of the shock strut. Disadvantages of the mechanism in the Hartel patent are that the shock strut piston is forced against the air pressure established in the shock strut, thereby placing undesirable stress on the shock strut sealing components. In addition, shrinking of the shock strut occurs throughout the movement of the landing gear from the extended position to the retracted position requiring the landing gear housing be somewhat larger than that which is necessary to store the landing gear. Still further, existing aircraft landing gear cannot be readily modified to incorporate such a configuration.

A number of systems have been proposed which avoid the actuator effort problem by the use of mechanically or electrically operated hydraulic valves that operate to relieve the pressure in the shock absorber during retraction. Systems which rely on valves to relieve the pressure have the disadvantage of adding to the weight, and complexity of the landing gear and retraction system. As a rule, designers seek to reduce the number of valves used in landing gear since valves tend to add to the number of possible failure points in the system. In addition, the accumulators that receive the pressurized fluid to relieve the pressure in the shock absorbing mechanism must also be accommodated, thereby decreasing the net space savings of the system.

Clearly there is a need in the art for a shock strut shrinking mechanism used with aircraft landing gear that requires a minimal number of parts enabling simpler installation and maintenance. There is also a need for a mechanism that is sufficiently compact so as to reduce linkage flexure. In addition, there is a need for a shock strut shrinking mechanism that requires a minimum number of airframe attachment points.

SUMMARY OF THE INVENTION

The subject invention is directed to an automatic shrink shock strut for an aircraft of the type having a frame and landing gear that is moveable between an extended position and a retracted position. The landing gear includes a shock strut cylinder and a shock strut piston mounted coaxially therewith and defining there between a shock strut shrink chamber and a gas spring chamber. Hydraulic fluid fills the shock strut shrink chamber and pressurized gas fills the gas spring chamber.

The automatic shrink shock strut includes a mechanism that transfers pressurized gas in a first instance from the gas spring chamber and utilizes the transferred pressurized gas to drive a volume of hydraulic fluid from a hydraulic fluid supply to the shock strut shrink chamber. In a second instance the mechanism returns the pressurized gas to the gas spring chamber to drive the volume of hydraulic fluid from the shock strut shrink chamber to the hydraulic fluid supply.

The pressurized gas drives the hydraulic fluid in a transfer cylinder that includes walls defining a transfer chamber extending therein. A transfer cylinder piston is reciprocally disposed in the transfer chamber and further separates the transfer chamber into a transfer chamber shrink portion and a transfer chamber head portion. A first conduit establishes fluid communication between the gas spring chamber and the transfer chamber head portion. A second conduit establishes fluid communication between the shock strut shrink chamber and the transfer chamber shrink portion. A mechanism is included for controlling the movement of the transfer cylinder piston.

The mechanism for controlling the transfer cylinder piston movement includes a retract actuator including side walls and first and second end walls defining an actuator chamber. The first wall is adjacent the transfer cylinder. The retract actuator and the transfer cylinder are pivotally attached to the aircraft frame. An actuator piston is reciprocally disposed in the actuator chamber and further delimits the actuator chamber into a retract chamber portion and an extend chamber portion. An actuator piston rod depending from the actuator piston and extending through the second wall of the retract actuator is operatively attached to the landing gear to move the landing gear between the extended position and the retracted position. A piston rod extension depends from the actuator piston and penetrates the first wall of the retract actuator and operatively contacts the transfer cylinder piston. A hydraulic supply and valving mechanism is included for supplying and directing hydraulic fluid to operated the retract actuator.

These and other features of the present invention will become more apparent to those skilled in the art upon inspection of the following detailed description read in conjunction with the attached figures.

BRIEF DESCRIPTION OF THE DRAWINGS

So that those having ordinary skill in the art to which the subject invention appertains will more readily understand how to make and use the automatic shrink shock strut described herein, a preferred embodiment of the invention will be described in detail herein below with reference to the drawings wherein.

DETAILED DESCRIPTION OF THE PREFERRED EMBODIMENTS

Figure 1:
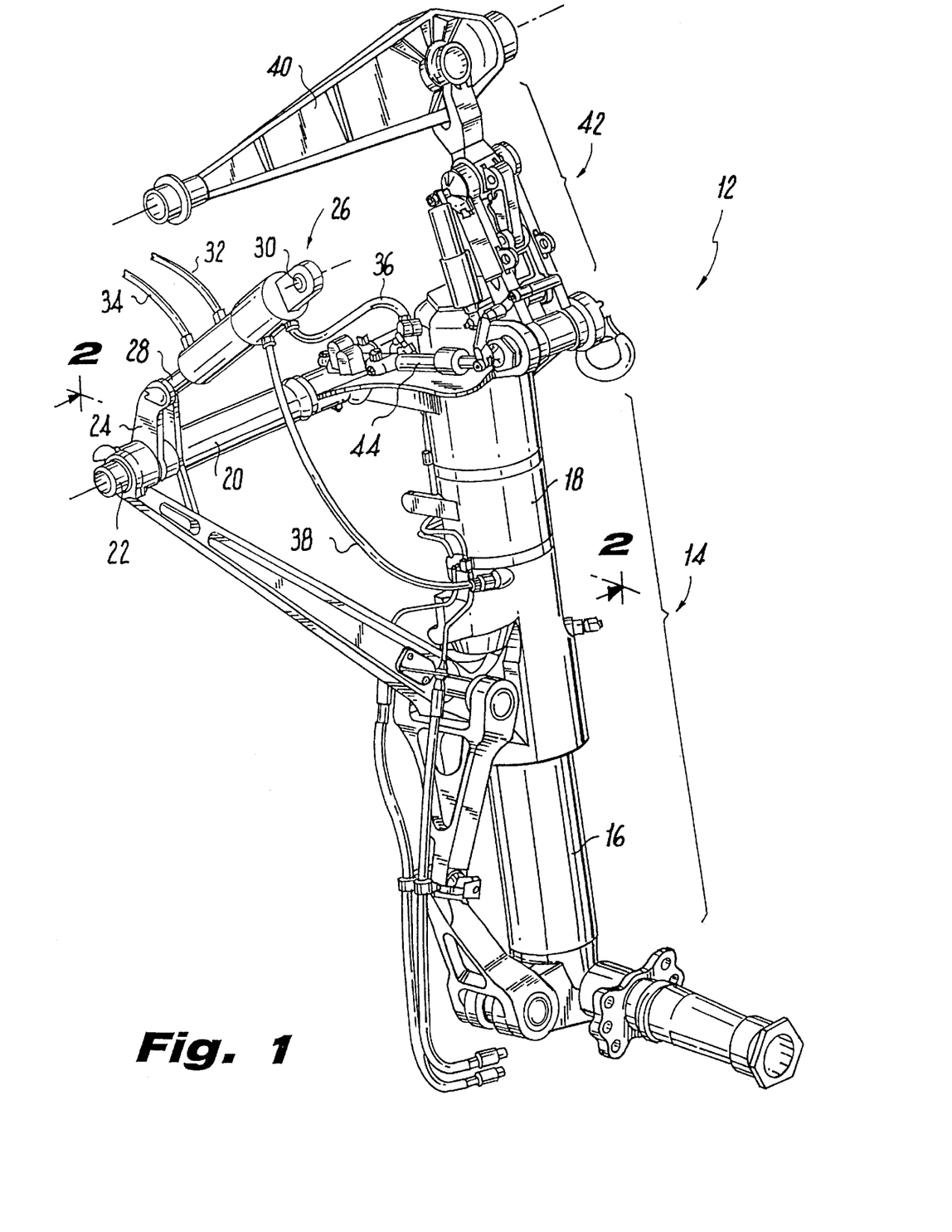
FIG. 1 is a perspective view of an aircraft landing gear in the extended position showing the relationship between a shock strut, a trunnion shaft and beam, a strut brace, and an automatic shrink shock strut constructed in accordance with a preferred embodiment of the subject invention.

Referring now to the drawings wherein like reference numerals identify similar structural elements of the subject invention, there is illustrated in FIG. 1 an aircraft landing gear designated generally by reference numeral 12, depicted in an extended position, and including an automatic shrink shock strut constructed in accordance with a preferred embodiment of the present invention. Landing gear 12 is of the type that attaches to the structure of an aircraft (not shown) and is laterally moveable between an extended position and a retracted position. In the retracted position landing gear 12 is housed within the fuselage of the aircraft. One skilled in the art will readily understand that the invention herein disclosed can be adapted for use in conjunction with body mounted or nose mounted landing gear. In addition, the mechanism can be included in laterally retracting as well as forward and aft retracting landing gear configuration.

Figure 2:
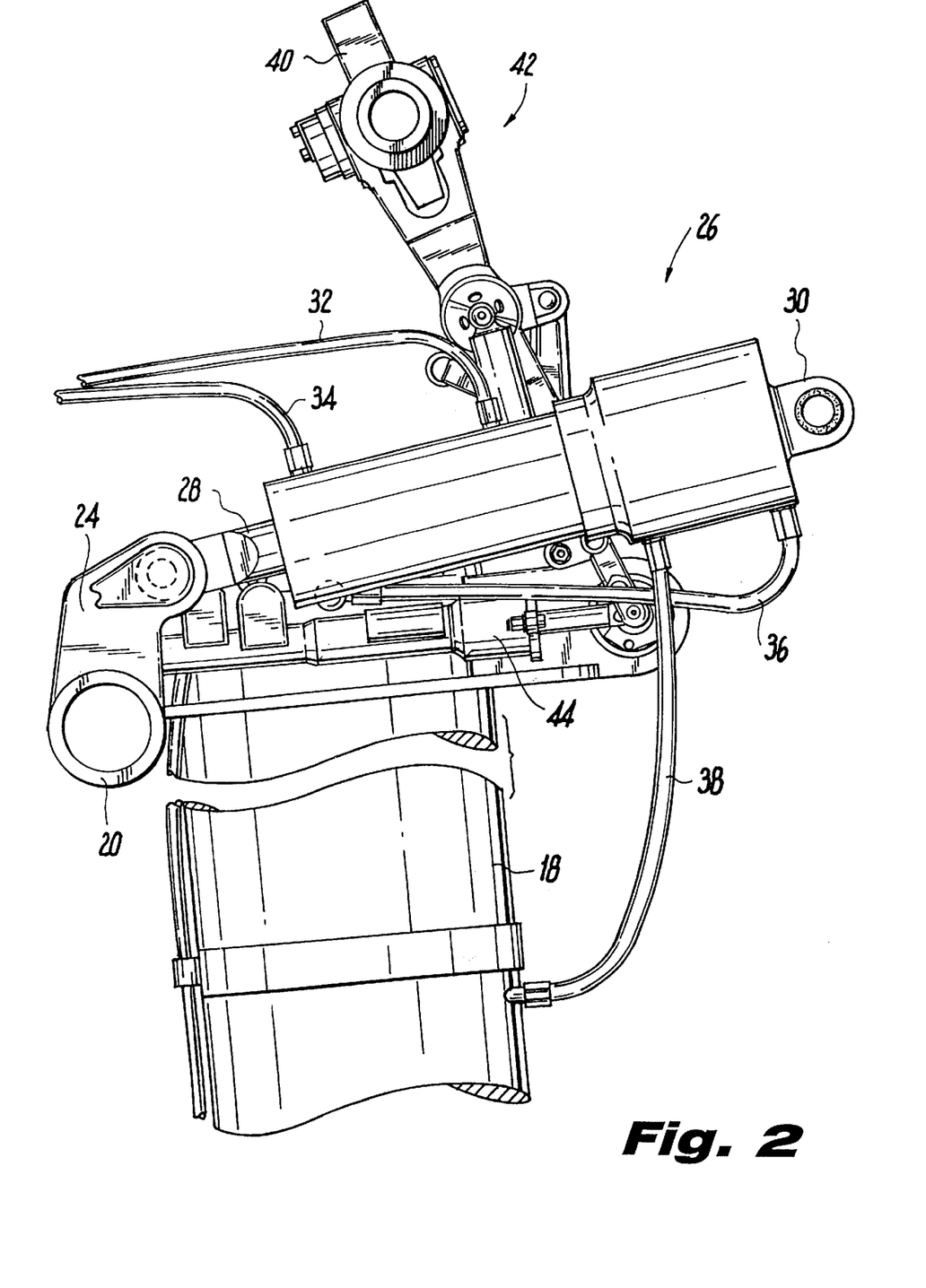
FIG. 2 is an elevation view, taken along line 2—2 of FIG. 1, of the automatic shrink shock strut of the present invention with the landing gear in the extended position and the landing gear actuator fully compressed.

Referring now to FIGS. 1 and 2, landing gear 12 includes a standard hydropneumatic shock strut 14 including a shock strut piston 16 having an upper portion which is telescoped inside an open end of a shock strut cylinder 18. A wheel (not shown) is rotatably mounted to the lower portion of the shock strut piston 16. A trunnion shaft 20 is attached normally to the upper end portion of the shock strut 14. Each end of the trunnion shaft 20 includes a shaft journal 22 which are rotatably mounted in bushings attached to the structure of the airplane (not shown). The landing gear 12 pivots about the axis of the trunnion shaft 20 to retract and extend during landing and takeoff of the aircraft.

A trunnion clevis 24 extends from the outer diameter of the trunnion shaft 20 providing an attachment point for a landing gear actuator 26. The landing gear actuator 26 is pinned at an actuator piston rod 28 extending from a first end to the trunnion clevis 24. A second end of the landing gear actuator 26 is pinned at an actuator body flange 30 to the structure of the aircraft. Hydraulic fluid is provided to the landing gear actuator 26 through conduits 32 and 34 to drive the landing gear 12 to the retracted position and the extended position. A conduit 36 provides fluid communication between the upper portion of the landing gear actuator 26 and an upper portion of shock strut cylinder 18. A conduit 38 provides fluid communication between a middle portion of the landing gear actuator 26 and a lower portion of the shock strut cylinder 18. As will be described in more detail below, conduits 36 and 38 are component parts of the mechanism that controls the shrinking of the shock strut 14.

A trunnion beam 40 is positioned above the landing gear 12 in parallel relation with the trunnion shaft 20 and is pivotally mounted to the structure of the aircraft (not shown). A reforming brace 42 is attached in an elongated position between the trunnion beam 40 and the landing gear 12. The reforming brace 42 provides support for the landing gear 12 while in the extended and retracted positions. The reforming brace 42 includes an unlock actuator 44 for locking and unlocking the reforming brace 42.

With continued reference to FIGS. 1 and 2, in operation, to move the landing gear 12 from the extended position to the retracted position, the unlock actuator 44 first unlocks the reforming brace 42. Then reforming brace 42 collapses from the elongated position, thereby enabling the landing gear 12 to rotate about the axis of the trunnion shaft 20. The landing gear actuator 26 then extends, driving the landing gear 12 about the axis of the trunnion shaft 20 to the retracted position. As the landing gear 12 retracts, the shock strut piston 16 is driven by the landing gear actuator 26 into the shock strut cylinder 18 and is fully withdrawn before the landing gear 12 is fully retracted into the landing gear housing (not shown). The details concerning the mechanism of the landing gear actuator 26 for driving the shock strut piston 16 are provided below. The landing gear actuator 26 continues to move the landing gear 12 until it is positioned in the fully retracted position. Once fully retracted, the unlock actuator 44 locks the reforming brace 42.

To move landing gear 12 from the retracted position to the extended position, the unlock actuator 44 first unlocks the reforming brace 42. The landing gear actuator 26 then compresses, driving the landing gear 12 about the axis of the trunnion shaft 20 to the extended position. Initially, as the landing gear 12 extends, the shock strut piston 16 remains withdrawn within the shock strut cylinder 18. Once the landing gear 12 clears the landing gear housing (not shown), the shock strut piston 16 is driven by the landing gear actuator 26 to extend. When the landing gear 12 is in the fully extended position, the unlock actuator 44 locks the reforming brace 42 in the elongated position.

Figure 3:
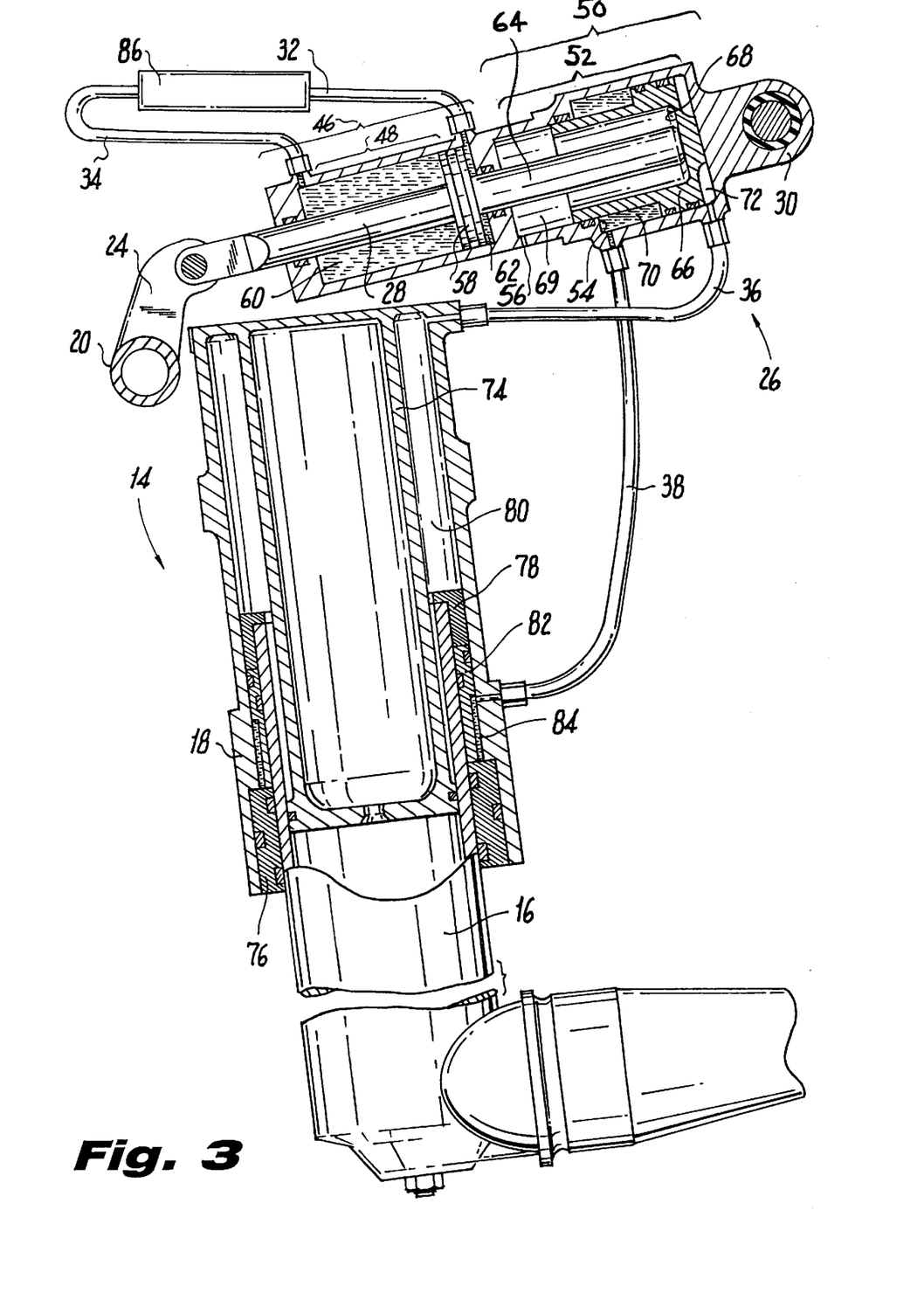
FIG. 3 is an elevational view in partial cross-section, similar to that of FIG. 2, of the automatic shrink shock strut of the subject invention with the landing gear in the extended position and the landing gear actuator fully compressed.

Referring now to FIG. 3, the landing gear actuator 26 includes a retract actuator cylinder 46 having an actuator chamber 48 formed therein. Integrally attached to the retract actuator is a transfer cylinder 50 having a transfer chamber 52 formed therein. The transfer chamber 52 is stepped, thereby creating an annular shoulder 54. A bleed orifice 56 extends through a wall of the transfer cylinder 50 to vent a portion of the transfer chamber 52 to the atmosphere.

An actuator piston 58 is reciprocally disposed within the actuator chamber 48 for driving the actuator piston rod 28 attached thereto. The actuator piston 58 divides the actuator chamber 48 into a retract chamber portion 60 and an extend chamber portion 62. Each chamber 48 and 62 are filled with hydraulic fluid. A piston rod extension 64 depends from a face of the actuator piston 58, opposite the actuator piston rod 28, and extends into the transfer chamber 52.

A transfer cylinder piston 66 is reciprocally disposed within the transfer chamber 52 and includes a bore having a bore face 68 therein. The piston rod extension 64 is in contacting relation with the bore face 68 of the transfer cylinder piston 66. The transfer cylinder piston 66 divides the transfer chamber 52 into three portions, namely, a transfer chamber stepped portion 69, a transfer chamber shrink portion 70, and a transfer chamber head portion 72. The transfer chamber portion 68 is open to the atmosphere through bleed orifice 56, while the transfer chamber shrink portion 70 is filled with hydraulic fluid, and the transfer chamber head portion 72 is filled with pressurized gas, for urging the transfer cylinder piston 66 against the end of the piston rod extension 64. Appropriate seals are provided, for example between the pistons 58 and 66, and chambers 48 and 52, respectively, as can be readily appreciated by one skilled in the art.

An orifice support tube 74 is disposed concentrically within the shock strut cylinder 18. The shock strut piston 16 is reciprocally received within the shock strut cylinder 18 in concentric relationship with and between the shock strut cylinder 18 and the orifice support tube 74. A lower shock strut bearing 76 is received within the open end of the shock strut cylinder 18 against which the shock strut piston 16 slides. An upper shock strut bearing 78 caps the end portion of the shock strut piston 16 within the shock strut cylinder 18 sliding against the interior of it. A gas spring chamber 80 is formed between the upper shock strut bearing 78, the shock strut cylinder 18, and the orifice support tube 74. The gas spring chamber 80 is pressurized with gas. A strut spacer 82 having a stepped portion on the outer diameter thereof is disposed between the interior bore of the shock strut cylinder 18, the shock strut piston 16, the upper shock strut bearing 78, and the lower shock strut bearing 76, allowing the shock strut piston 16 to extend a predetermined distance. A shock strut shrink chamber 84 is formed between the stepped portion of the strut spacer 82, the shock strut cylinder 18, and the lower bearing 76. The shock strut shrink chamber 84 is filled with hydraulic fluid.

A selector valve 86 which directs hydraulic supply pressure and return pressure to the landing gear actuator 26 is in fluid communication with a first end of the actuator extend chamber portion 62 through conduit 32. The selector valve 86 is also in fluid communication with actuator retract chamber portion 60 through conduit 34. A conduit 38 provides fluid communication between the shock strut shrink chamber 84 and the transfer chamber shrink portion 70. A conduit 36 is provided between the gas spring chamber 80 and the transfer chamber head portion 72.

Figure 4:
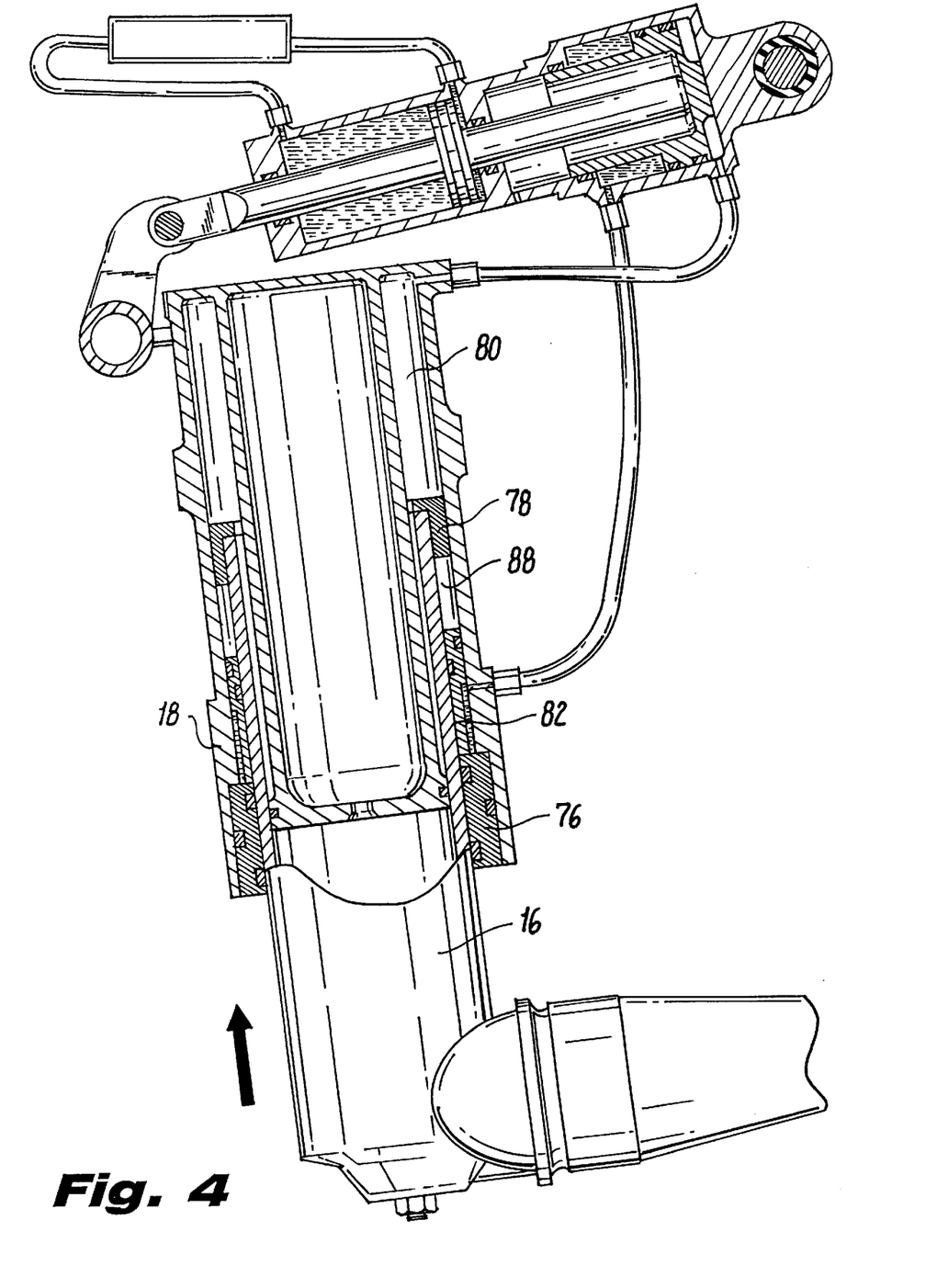
FIG. 4 is an elevational view in partial cross-section, similar to that of FIG. 3, of the automatic shrink shock strut of the subject invention with the landing gear in the fully extended position and the shock strut partially compressed.

Referring now to FIGS. 3 and 4, the landing gear 12 is illustrated in the extended and unloaded position as in the case when the landing gear 12 is extended in preparation for landing the aircraft or after taking off. In such case, the upper shock strut bearing 78, strut spacer 82, and lower shock strut bearing 76 are forced into contact due to the bias caused by the pressurized gas within gas spring chamber 80.

In FIG. 4, the landing gear 12 is illustrated in the extended and loaded position functioning as a normal landing gear shock absorber, as in the case when the aircraft lands or is taxiing across the airfield. In such case, the pressurized gas in the gas spring chamber 80 is further compressed as the shock absorber absorbs the energy of the loads exerted thereupon. The strut spacer 82 remains in contacting relation with the lower shock strut bearing 76 and a rebound chamber 88 is established between the upper shock strut bearing 78 and the strut spacer 82. As the shock strut piston 16 again extends, the fluid in the rebound chamber 88 absorbs the energy stored by the compressed gas in the gas spring chamber 80 during the compression stroke.

Figure 5:
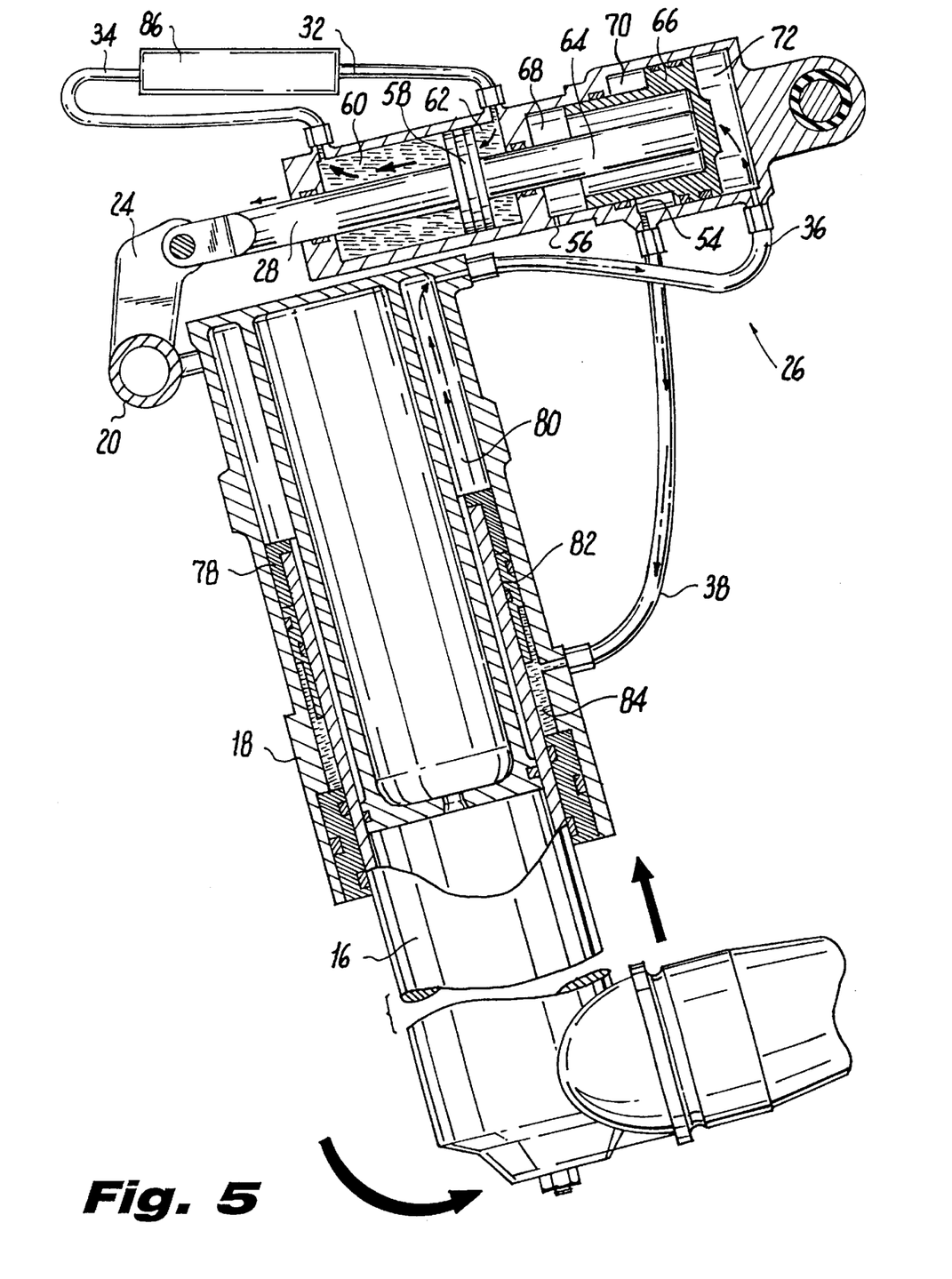
FIG. 5 is an elevational view in partial cross-section, similar to that of FIG. 3, of the automatic shrink shock strut of the subject invention with the landing gear in the partially retracted position and the shock strut partially shrunk.

Referring now to FIG. 5, there is illustrated the landing gear 12 in the partially retracted position and the shock strut piston 16 partially withdrawn into the shock strut cylinder 18. This relationship is established by the activation of selector valve 86 which supplies fluid through conduit 32 to the extend chamber portion 62 of landing gear actuator 26, and return fluid from the return chamber portion 60 through conduit 34. An appropriate hydraulic supply system (not shown) including, for example, a hydraulic pump and fluid reservoir, are necessary to feed the selector valve 86. Actuator piston 58 is shifted to extend the actuator piston rod 28, and rotate the trunnion clevis 24 and landing gear 12 about the axis of the trunnion shaft 20. The piston rod extension 64 moves in conjunction with the actuator piston 58.

At such a time, the pressurized gas in the transfer chamber head portion 72 forces the transfer cylinder piston 66 to shift so as to maintain its contacting relationship with the piston rod extension 64. In response to the movement of the transfer cylinder piston 66, hydraulic fluid in the transfer shrink portion 70 flows through conduit 38 into the shock strut shrink chamber 84. Thereupon, the fluid pressure in the shock strut shrink chamber 84 is sufficient to force the strut spacer 82, upper shock strut bearing 78, and shock strut piston 16 to withdraw into the shock strut cylinder 18. As the volume of the transfer chamber stepped portion 69 is reduced, air exhausts to the atmosphere through the bleed orifice 56.

With continued reference to FIG. 5, just prior to the landing gear 12 entering the landing gear housing of the aircraft, the transfer cylinder piston 66 bottoms on the annular shoulder 54 of the transfer chamber 52. Because the volume of the transfer chamber head portion 72 is approximately equal to the volume of the gas spring chamber 80 and the volume of the transfer chamber shrink portion 70 is approximately equal to the shock strut shrink chamber 84, the shock strut piston 16 is fully withdrawn into the shock strut cylinder 18. It will be appreciated that the respective volumes may be altered to cause the shock strut piston 16 to withdraw to a lesser extent.

Figure 6:
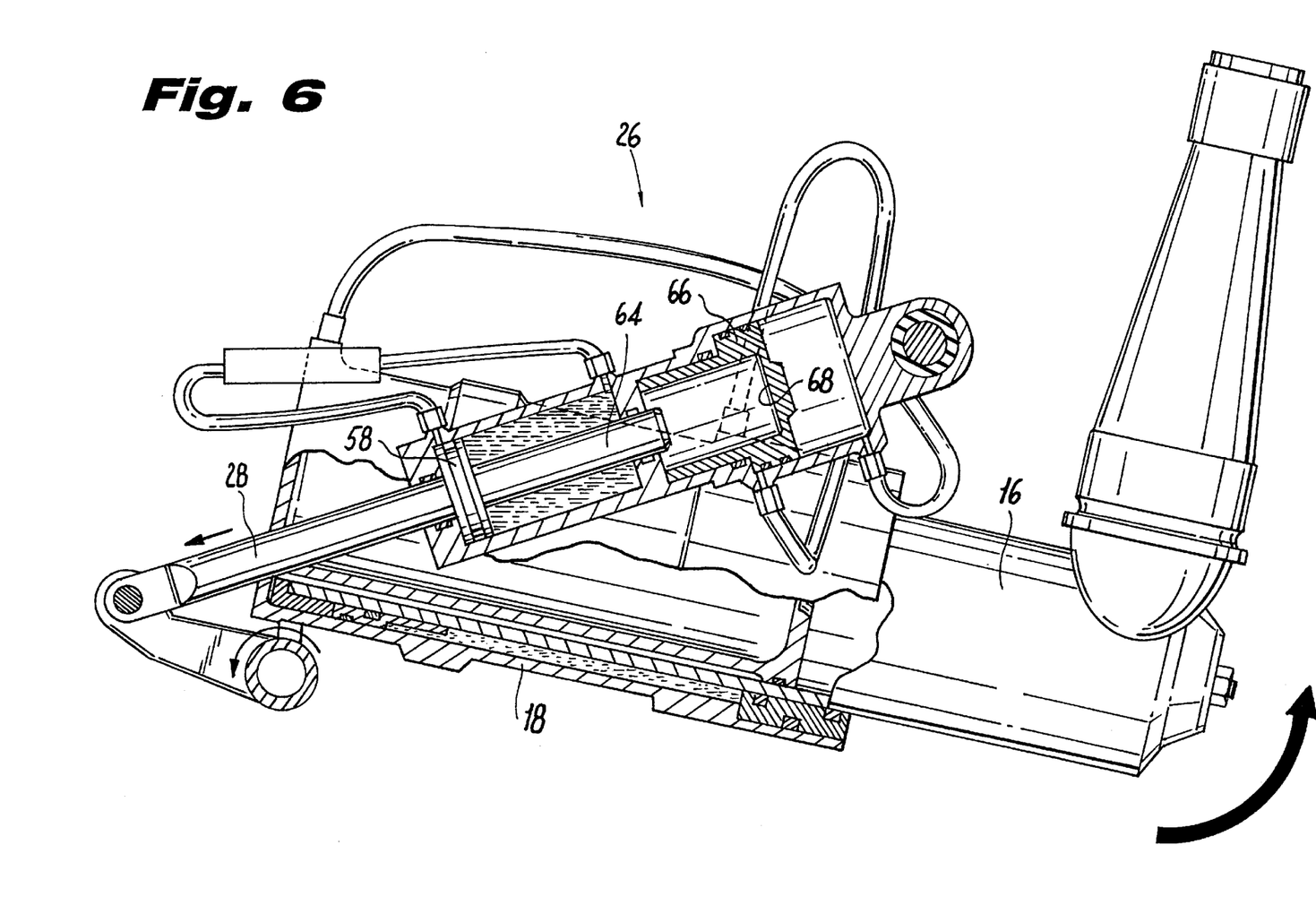
FIG. 6 is an elevational view in partial cross-section, similar to that of FIG. 3, of the automatic shrink shock strut of the subject invention with the landing gear in the fully retracted position and the shock strut fully shrunk.

Referring to FIG. 6, with the shock strut piston 16 fully withdrawn into the shock strut cylinder 18, as shown, the actuator piston 58, actuator piston rod 28, and piston rod extension 64 continues to rotate the landing gear 12 until fully retracted into the landing gear housing. At this time, a gap is formed between the end of the piston rod extension 64 and the bore face 68 of the transfer cylinder piston 66.

Extension of the landing gear 12 occurs in a manner similar to that described above, but in reverse sequential order, with selector valve 86 reversing the flow of hydraulic fluid through conduits 32 and 34 to effect movement of the landing gear from the retracted position.

In the above description, the retract actuator cylinder 46 and associated components are used to control the movement of the transfer cylinder piston 66. It is envisioned however, that various other methods may be employed to control the motion of the transfer cylinder piston 66. For example, the retract actuator cylinder 46 can be separated from the transfer cylinder 50, and each suitably linked to the trunnion shaft 20. Alternately, the transfer cylinder can be controlled by a motor driven linear actuator that includes an appropriate mechanism for sensing the position of the landing gear.

Although a preferred embodiment of the subject invention has been illustrated and described herein, it is intended to be understood by those skilled in the art that various changes and/or modifications can be made to the subject invention without departing from the spirit and scope of the invention as defined in the appended claims.

What is claimed is:

1. An automatic shrink shock strut for an aircraft having a frame and landing gear that is moveable between an extended position and a retracted position and is of the type including a shock strut cylinder and a shock strut piston mounted coaxially therewith and defining there between a shock strut shrink chamber enclosing hydraulic fluid therein and a gas spring chamber enclosing pressurized gas therein, the shrink shock strut comprising:

means in a first instance for transferring the pressurized gas from the gas spring chamber and utilizing the transferred pressurized gas to drive a volume of hydraulic fluid from a hydraulic fluid supply to the shock strut shrink chamber and in a second instance for returning the pressurized gas to the gas spring chamber to drive the volume of hydraulic fluid from the shock strut shrink chamber to the hydraulic fluid supply.

2. An automatic shrink shock strut for an aircraft as recited in claim 1, wherein said means includes:

a transfer cylinder defining a transfer chamber therein;

a transfer cylinder piston mounted for reciprocal motion within said transfer chamber and delimiting said transfer chamber into a transfer chamber shrink portion and a transfer chamber head portion;

a first conduit establishing fluid communication between the gas spring chamber and said transfer chamber head portion;

a second conduit establishing fluid communication between the shock strut shrink chamber and said transfer chamber shrink portion, and means for controlling reciprocal movement of said transfer cylinder piston.

3. An automatic shrink shock strut for an aircraft having a frame and landing gear that is moveable between an extended position and a retracted position and is of the type including a shock strut cylinder and a shock strut piston mounted coaxially therewith and defining there between a shock strut shrink chamber enclosing hydraulic fluid therein and a gas spring chamber enclosing pressurized gas therein, the shrink shock strut comprising:

means in a first instance for transferring the pressurized gas from the gas spring chamber and utilizing the transferred pressurized gas to drive a volume of hydraulic fluid from a hydraulic fluid supply to the shock strut shrink chamber and in a second instance for returning the pressurized gas to the gas spring chamber to drive the volume of hydraulic fluid from the shock strut shrink chamber to the hydraulic fluid supply;

wherein said means includes:

a transfer cylinder defining a transfer chamber therein;

a transfer cylinder piston mounted for reciprocal motion within said transfer chamber and delimiting said transfer chamber into a transfer chamber shrink portion and a transfer chamber head portion;

a first conduit establishing fluid communication between the gas spring chamber and said transfer chamber head portion;

a second conduit establishing fluid communication between the shock strut shrink chamber and said transfer chamber shrink portion; and means for controlling reciprocal movement of said transfer cylinder piston wherein said controlling means includes: a retract actuator including opposed first and second end walls defining an actuator chamber, said first end wall formed adjacent said transfer cylinder, said retract actuator and said transfer cylinder being pivotally attached to the aircraft frame; an actuator piston mounted for reciprocal motion within said actuator chamber and delimiting said actuator chamber into a retract chamber portion and an extend chamber portion; an actuator piston rod depending from said actuator piston and extending through the second end wall of said retract actuator, said actuator piston rod being operatively attached to the landing gear to move the landing gear between the extended position and the retracted position; and a piston rod extension depending from said actuator piston and penetrating the first end wall of said retract actuator, said piston rod extension operative to contact said transfer cylinder piston.

4. An automatic shrink shock strut for an aircraft as recited in claim 3, further including valving means for directing hydraulic fluid to said retract actuator.

5. An automatic shrink shock strut for an aircraft having a frame and landing gear that is moveable between an extended position and a retracted position and is of the type including a shock strut cylinder and a shock strut piston mounted coaxially therewith and defining there between a shock strut shrink chamber enclosing hydraulic fluid therein and a gas spring chamber enclosing pressurized gas therein, the shrink shock strut comprising:

a transfer cylinder defining a transfer chamber therein;

a transfer cylinder piston mounted for reciprocal motion within said transfer chamber configured and adapted to delimit the transfer chamber into a transfer chamber head portion and a transfer chamber shrink portion, said transfer chamber shrink portion enclosing hydraulic fluid;

a first conduit establishing fluid communication between the gas spring chamber and said transfer chamber head portion;

a second conduit establishing fluid communication between the shock strut shrink chamber and said transfer chamber shrink portion.

6. An automatic shrink shock strut for an aircraft having a frame and landing gear that is moveable between an extended position and a retracted position and is of the type including a shock strut cylinder and a shock strut piston mounted coaxially therewith and defining there between a shock strut shrink chamber enclosing hydraulic fluid therein and a gas spring chamber enclosing pressurized gas therein, the shrink shock strut comprising:

a transfer cylinder defining a transfer chamber therein;

a transfer cylinder piston mounted for reciprocal motion within said transfer chamber configured and adapted to delimit the transfer chamber into a posterior transfer chamber, an anterior transfer chamber head portion and a lateral transfer chamber shrink portion, said transfer chamber shrink portion enclosing hydraulic fluid;

a first conduit establishing fluid communication between the gas spring chamber and said transfer chamber head portion;

a second conduit establishing fluid communication between the shock strut shrink chamber and said transfer chamber shrink portion;

wherein the transfer cylinder piston is further configured and adapted to compress the transfer chamber shrink portion, so as to transfer hydraulic fluid enclosed therein to said shock strut shrink chamber through said second conduit, when the transfer cylinder piston is moved along the transfer cylinder in such a manner as to decrease the volume of the posterior transfer chamber portion, and to increase the volume of the transfer chamber head portion.

7. An automatic shrink shock strut for an aircraft having a frame and landing gear that is moveable between an extended position and a retracted position and is of the type including a shock strut cylinder and a shock strut piston mounted coaxially therewith and defining there between a shock strut shrink chamber enclosing hydraulic fluid therein and a gas spring chamber enclosing pressurized gas therein, the shrink shock strut comprising:

a transfer cylinder defining a transfer chamber therein;

a transfer cylinder piston mounted for reciprocal motion within said transfer chamber and delimiting said transfer chamber into a transfer chamber shrink portion and a transfer chamber head portion;

a first conduit establishing fluid communication between the gas spring chamber and said transfer chamber head portion;

a second conduit establishing fluid communication between the shock strut shrink chamber and said transfer chamber shrink portion; and means for controlling reciprocal movement of said transfer cylinder piston, wherein said controlling means includes: an actuator defining an actuator chamber, and an end wall formed adjacent said transfer cylinder; an actuator piston mounted for reciprocal motion within said actuator chamber and delimiting said actuator chamber into a retract chamber portion and an extend chamber portion; and a piston rod extension depending from said actuator piston and penetrating the end wall of said actuator, said piston rod extension operative to contact said transfer cylinder piston.

8. An improved method for the retraction and extension of an automatic shrink shock strut for an aircraft having a frame and landing gear that is moveable between an extended position and a retracted position and is of the type including a shock strut cylinder and a shock strut piston mounted coaxially therewith and defining there between a shock strut shrink chamber enclosing hydraulic fluid therein and a gas spring chamber enclosing pressurized gas therein, wherein the improvement comprises using the pressurized gas in the gas spring chamber to cause movement of hydraulic fluid into the shock strut shrink chamber.

9. A method for the retraction and extension of an automatic shrink shock strut for an aircraft having a frame and landing gear that is moveable between an extended position and a retracted position and is of the type including a shock strut cylinder and a shock strut piston mounted coaxially therewith and defining there between a shock strut shrink chamber enclosing hydraulic fluid therein and a gas spring chamber enclosing pressurized gas therein, wherein the method comprises:

conveying pressurized gas from the gas spring chamber to at least one of a first and second chamber portions in a transfer cylinder; and conveying hydraulic fluid from the other of the first and second chamber portions of the transfer cylinder to the shock strut shrink chamber.

* * * * *